US012810145B2

(12) United States Patent
Kobayashi et al.

(10) Patent No.: US 12,810,145 B2
(45) Date of Patent: Nov. 24, 2026

(54) VALIDATION METRIC FOR ATTRIBUTION-BASED EXPLANATION METHODS FOR ANOMALY DETECTION MODELS

(71) Applicant: Oracle International Corporation, Redwood Shores, CA (US)

(72) Inventors: Kenyu Kobayashi, Lausanne (CH); Arno Schneuwly, Effretikon (CH); Renata Khasanova, Zurich (CH); Matteo Casserini, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 868 days.

(21) Appl. No.: 17/873,482

(22) Filed: Jul. 26, 2022

(65) Prior Publication Data

US 2024/0037383 A1 Feb. 1, 2024

(51) Int. Cl.
*G06N 3/08* (2023.01)

(52) U.S. Cl.
CPC .................................... *G06N 3/08* (2013.01)

(58) Field of Classification Search
CPC ....................................................... G06N 3/08
See application file for complete search history.

(56) References Cited

U.S. PATENT DOCUMENTS 11,568,049 B2 1/2023 Mathews
11,595,415 B2 2/2023 Stergioudis
11,682,111 B2 * 6/2023 Pastore ............... G06F 18/2415
435/7.3

(Continued)

FOREIGN PATENT DOCUMENTS

WO WO-2022096577 A1 * 5/2022 ............ G06N 3/042

OTHER PUBLICATIONS

Ribeiro et al. (âWhy Should I Trust You?â Explaining the Predictions of Any Classifier, published 2016) (Year: 2016).*

(Continued)

*Primary Examiner* — David Yi
*Assistant Examiner* — Syed Rayhan Ahmed
(74) *Attorney, Agent, or Firm* — Hickman Becker Bingham Ledesma LLP

(57) ABSTRACT

Herein are machine learning (ML) explainability (MLX) techniques for calculating and using a novel fidelity metric for assessing and comparing explainers that are based on feature attribution. In an embodiment, a computer generates many anomalous tuples from many non-anomalous tuples. Each anomalous tuple contains a perturbed value of a respective perturbed feature. For each anomalous tuple, a respective explanation is generated that identifies a respective identified feature as a cause of the anomalous tuple being anomalous. A fidelity metric is calculated by counting correct explanations for the anomalous tuples whose identified feature is the perturbed feature. Tuples may represent entries in an activity log such as structured query language (SQL) statements in a console output log of a database server. This approach herein may gauge the quality of a set of MLX explanations for why log entries or network packets are characterized as anomalous by an intrusion detector or other anomaly detector.

20 Claims, 6 Drawing Sheets

(56) References Cited

U.S. PATENT DOCUMENTS

| | | | | |
|---|---|---|---|---|
| 11,755,733 | B1 * | 9/2023 | Armangau | G06F 21/568 726/23 |
| 11,880,394 | B2 | 1/2024 | Zamfir | |
| 11,907,334 | B2 | 2/2024 | Le | |
| 11,961,287 | B2 | 4/2024 | Rodriguez | |
| 12,057,208 | B1 * | 8/2024 | Esman | G16H 20/13 |
| 2006/0036581 | A1 * | 2/2006 | Chakrabarti | G06F 16/24578 |
| 2013/0151543 | A1 * | 6/2013 | Fan | G11B 27/32 707/758 |
| 2019/0122135 | A1 | 4/2019 | Parker | |
| 2019/0279042 | A1 | 9/2019 | Cataltepe | |
| 2021/0049503 | A1 | 2/2021 | Nourian | |
| 2021/0067549 | A1 * | 3/2021 | Chen | G06N 3/045 |
| 2021/0133630 | A1 | 5/2021 | Dalli | |
| 2021/0142190 | A1 | 5/2021 | Isahagian | |
| 2021/0158221 | A1 | 5/2021 | Marlin | |
| 2021/0158227 | A1 | 5/2021 | Budzik | |
| 2021/0319315 | A1 * | 10/2021 | Hutmacher | G06N 20/00 |
| 2022/0053005 | A1 * | 2/2022 | Liu | G06V 10/454 |
| 2022/0130143 | A1 | 4/2022 | Rodriguez | |
| 2022/0180124 | A1 | 6/2022 | Le | |
| 2022/0284499 | A1 | 9/2022 | Dornadula | |
| 2022/0309360 | A1 | 9/2022 | Zohrevand | |
| 2022/0335255 | A1 | 10/2022 | Zohrevand et al. | |
| 2022/0335315 | A1 * | 10/2022 | Zonca | G06N 5/045 |
| 2022/0343157 | A1 * | 10/2022 | Mankowitz | G06N 3/092 |
| 2022/0351094 | A1 | 11/2022 | Hamamoto | |
| 2022/0366297 | A1 | 11/2022 | Pushak et al. | |
| 2022/0391631 | A1 | 12/2022 | Bin Tariq | |
| 2023/0334343 | A1 | 10/2023 | Khasanova | |
| 2025/0013892 | A1 * | 1/2025 | Okajima | G06N 5/04 |

OTHER PUBLICATIONS

Ludberg et al. (A Unified Approach to Interpreting Model Predictions, published 2017) (Year: 2017).*

Ma et al. (Deep Extreme Feature Extraction: New MVA Method for Searching Particles in High Energy Physics, published 2016) (Year: 2016).*

Mulang et al. (Post-discovery Analysis of Anomalous Subsets, published 2021) (Year: 2021).*

Ribeiro et al. (Why Should I Trust You? Explaining the Predictions of Any Classifier, published 2016) (Year: 2016).*

Erba et al. (Constrained Concealment Attacks against Reconstruction-based Anomaly Detectors in Industrial Control Systems) (Year: 2020).*

Balagopalan et al. (The Road to Explainability is Paved with Bias: Measuring the Fairness of Explanations, published Jun. 2022) (Year: 2022).*

Sundararajan et al., "Axiomatic Attribution for Deep Networks", Proceedings of the 34th International Conference on Machine Learning, Jun. 13, 2017, 11 pages.

Ribeiro et al., "Why Should I Trust You? Explaining the Predictions of Any Classifier", In Proceedings of the 22nd ACM SIGKDD International Conference on Knowledge Discovery and Data Mining, dated Aug. 2016, 10 pages.

Montavon et al., "Methods for interpreting and understanding deep neural networks", Digital Signal Processing, vol. 73, Feb. 2018, 15 pages.

Lundberg et al., "A Unified Approach to Interpreting Model Predictions", 31st Conference on Neural Information Processing Systems, https://proceedings.neurips.cc/paper/2017/file/8a20a8621978632d76c43dfd28b67767-Paper.pdf, dated 2017, 10 pages.

Linardatos et al., "Explainable AI: A Review of Machine Learning Interpretability Methods", Entropy, 23(1), 2021, 45 pages.

Kobayashi et al., "Backpropagation-based Explainability Method for Unsupervised Models based on Autoencoder Architectures", Feb. 22, 2022, 15 pages.

Doshi-Velez et al., "Towards A Rigorous Science of Interpretable Machine Learning", Mar. 2, 2017, 13 pages.

Arras et al., "What is relevant in a text document?: An interpretable machine learning approach", PLoS One, Aug. 11, 2017, 23 pages.

Ancona et al., "Towards Better Understanding of Gradient-Based Attribution Methods for Deep Neural Networks", ICLR 2018, Mar. 7, 2018, 16 pages.

Sood, Akshay, et al., "Feature Importance Explanations for Temporal Black-Box Models", Cornell Univ Library, XP81891289, https://arxiv.org/abs/2102.11934v1, Feb. 23, 2021, 13 pages.

Miroshnikov, Alexey, et al. "Mutual information-based group explainers with coalition structure for machine learning model explanations", 2021.

Au et al; "Grouped feature importance and combined features effect plot", 2021.

Ravi et al., "General Frameworks for Anomaly Detection Explainability: Comparative Study" from IEEE International Conference on Autonomous Systems (ICAS) <https://doi.org/10.1109/ICAS49788.2021.9551129> Oct. 6, 2021.

Takaeishi, "Shapley Values of Reconstruction Errors of PCA for Explaining Anomaly Detection" IEEE <https://doi.org/10,1109/ICDMW.2019.00117> Jan. 13, 2020.

* cited by examiner

COMPUTER 100

| CORPUS 110 | FEATURES 130 | | | | | | |
|---|---|---|---|---|---|---|---|
| | F1 | F2 | F3 | F4 | F5 | F6 | F7 |
| ORIGINAL TUPLES 121 | ORIGINAL VALUES 122 | | | | | | |
| T1 | V1 | V2 | V3 | V4 | V10 | V12 | V16 |
| T2 | V1 | V5 | V6 | V7 | V10 | V13 | V17 |
| T3 | V8 | V8 | V8 | V9 | V10 | V14 | V16 |
| T4 | V2 | V2 | V3 | V9 | V11 | V15 | V17 |

| ANOMALOUS TUPLES 140 | VALUES 145 | | | | | | | EXPLAINER 181 | EXPLAINER 182 |
|---|---|---|---|---|---|---|---|---|---|
| P2 | V1 | V5 | V6 | **V15** | V10 | V13 | V17 | **F4** | F6, **F4**, F1 |
| P1 | V1 | V2 | V3 | V4 | V10 | **V18** | V16 | F2 | F7, F1, F5 |
| P4 | V2 | **V5** | V3 | V9 | V11 | V15 | V17 | **F2** | F1, F6, F3 |
| | | | | | | | | COUNT = 2 | COUNT = 1 |
| FEATURES | F1 | F2 | F3 | F4 | F5 | F6 | F7 | | |
| | GROUP 131 | | GROUP 132 | | | GROUP 133 | | | |

| FEATURES | F1 | F2 | F3 | F4 | F5 | F6 | F7 |
|---|---|---|---|---|---|---|---|
| VALUES | V8 | V8 | V2 | V0 | V11 | V14 | V17 |
| | TUPLE TO EXPLAIN T5 | | | | | | |

VALIDATION METRIC FOR ATTRIBUTION-BASED EXPLANATION METHODS FOR ANOMALY DETECTION MODELS

FIELD OF THE INVENTION

The present invention relates to machine learning (ML) explainability (MLX). Herein are techniques for calculating and using a novel fidelity metric for explainers that are based on feature attribution.

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Deep learning is a prime example of this trend. Other ML algorithms, such as neural networks, may only contain a few layers of densely connected neurons, whereas deep learning algorithms, such as convolutional neural networks, may contain tens to hundreds of layers of neurons performing very different operations. Increasing the depth of the neural model and heterogeneity of layers provides many benefits. For example, going deeper can increase the capacity of the model, improve the generalization of the model, and provide opportunities for the model to filter out unimportant features, while including layers that perform different operations can greatly improve the performance of the model. However, these optimizations come at the cost of increased complexity and reduced human interpretability of model operation.

Explaining and interpreting the results from complex deep learning models is a challenging task compared to many other ML models. For example, a decision tree may perform binary classification based on N input features. During training, the features that have the largest impact on the class predictions are inserted near the root of the tree, while the features that have less impact on class predictions fall near the leaves of the tree. Feature importance can be directly determined by measuring the distance of a decision node to the root of the decision tree.

Such models are often referred to as being inherently interpretable. However, as the complexity of the model increases (e.g., the number of features or the depth of the decision tree increases), it becomes increasingly challenging to interpret an explanation for a model inference. Similarly, even relatively simple neural networks with a few layers can be challenging to interpret, as multiple layers combine the effects of features and increase the number of operations between the model inputs and outputs. Consequently, there is a requirement for alternative techniques to aid with the interpretation of complex ML and deep learning models.

To explain the rationale behind an ML model's decision-making process, a commonly used class of method is attribution-based, which indicates how much each feature in a model contributed to the predictions for each given instance. However, a fundamental challenge is the evaluation of the quality of such explainability methods. Evaluation of explanations can be divided into the three following approaches:

- Application-grounded: experiments with end-users by assessing the quality of explanations with analysts (human experts with enough knowledge of the application to determine whether a given explanation is coherent).
- Human-grounded: experiments with regular users by testing general notions of the quality of an explanation which does not require expertise (such as choosing the explanation that seems to be of higher quality when being presented pairs of explanation).
- Functionally-grounded: using formal definitions of explainability as a proxy for explanation quality.

Most of the existing techniques focus on human-centered evaluations, which fall into the first two categories above. However, those methods require extraordinary time and cost to perform. Those methods are too expensive and too unreliable for use cases that naturally occur while continuously developing, testing, and adapting a range (i.e. multiple) of explainability methods.

Some functionally-grounded evaluation methods are axiomatic, which means that they focuses on defining theoretically desirable properties for attribution-based methods such as sensitivity, implementation invariance, continuity, selectivity, conservation, and consistency. However, those properties are secondary indicators of explanation quality and do not directly and empirically measure explanation quality. Thus, the reliability and accuracy of axiomatic MLX evaluation methods in practice may be decreased.

Some MLX evaluation methods do not work with opaque (i.e. black-box) ML models whose internal architecture is hidden or too complex, such as an artificial neural network (ANN). Some MLX evaluation methods only work with interpretable ML models whose internal architecture directly reflects the ML model's behavior, such as a decision tree.

DETAILED DESCRIPTION

Figure 1:
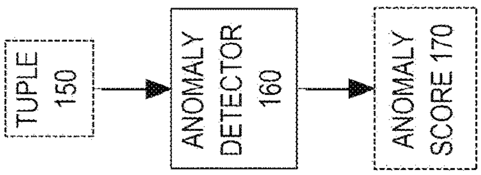
FIG. 1 is a block diagram that depicts an example computer that calculates and uses a novel fidelity metric for machine learning explainability (MLX) explainers that are based on feature attribution.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are machine learning (ML) explainability (MLX) techniques for calculating and using a novel fidelity metric for assessing and comparing explainers that are based on feature attribution. This new metric has the following advantages:

- Model agnostic and explainer agnostic,
- Provides a way to quantify the quality of a set of explanations from an explainer,
- Does not require any prior explanation labels, prior classification labels, nor prior anomaly scores, and
- Well suited for explaining anomaly detection.

The approach herein provides empirical evaluations that practically assess the actually achieved performance of a given explainability method on a specific use-case. This facilitates important analysis such as determining whether a given method actually delivers satisfactory explanations or comparing different explanation methods to choose the most adapted one for an application.

This approach evaluates the capability of an attribution-based explanation to identify the anomalous feature when being presented an anomalous datapoint, where the anomalous feature causes the datapoint to be anomalous. Such an evaluation is based on artificially creating anomalous datapoints, for which the anomalous features are determined before explanations are requested.

Anomalous datapoints are artificially created by feature perturbation as imperfect copies of non-anomalous datapoints. Thus, the perturbed feature is determined before an explanation is requested. This approach entails creating an artificial dataset of anomalous datapoints and generating explanation labels that indicate the respective anomalous feature for each datapoint, which provides an expected correct explanation for each anomaly. Using these explanation labels, it is possible to determine which subsequently generated explanations are correct or incorrect, which facilitates quantifying the quality of the delivered attribution-based explanations as a calculated fidelity metric.

In contrast to MLX techniques that seek perturbations that have minimal impact on the ML model's behavior, the approach herein is dedicated to perturbations that are disruptive enough to cause reclassification (e.g. from non-anomaly to anomaly). In contrast to MLX techniques that can tolerate disruptive reclassification only if the reclassifications are statistically balanced (e.g. bidirectional with roughly equal amounts of reclassifications from anomaly to non-anomaly as from non-anomaly to anomaly), the approach herein expects reclassification to be unidirectional.

Because perturbations generate artificial datapoints that are unfamiliar (i.e. not in the training corpus of the ML model), there is a natural tendency for perturbation to cause anomalies. That bias towards anomalies decreases the accuracy and speed of other MLX validation techniques that prefer a balanced corpus and/or neutral perturbations. The approach herein evaluates a set of anomaly detection explanations in less time and with increased accuracy because the bias towards anomalies assists, rather than hinders, this approach.

In an embodiment, a computer generates many anomalous tuples from many non-anomalous tuples. Each anomalous tuple contains a perturbed value of a respective perturbed feature. For each anomalous tuple, a respective explanation is generated that identifies a respective identified feature as a cause of the anomalous tuple being anomalous. A fidelity metric is calculated by counting correct explanations for the anomalous tuples whose identified feature is the perturbed feature.

In an embodiment, tuples represent entries in an activity log. For example, tuples may represent database commands such as structured query language (SQL) statements in a console output log of a database server. The approach herein may be used to gauge the quality of a set of MLX explanations for why log entries or network packets are characterized as anomalous by an intrusion detector or other anomaly detector.

1.0 Example Computer

FIG. 1 is a block diagram that depicts an example computer 100, in an embodiment. For machine learning (ML) explainability (MLX), computer 100 applies techniques for calculating and using a novel fidelity metric for explainers 181-182 that are based on feature attribution. Computer 100 may be one or more of a rack server such as a blade, a personal computer, a mainframe, a virtual computer, or other computing device.

1.1 Anomaly Detector

Computer 100 hosts in memory and operates anomaly detector 160 that may or may not have an unknown, opaque (i.e. black box), or confusing architecture that more or less precludes direct inspection and interpretation of the internal operation of anomaly detector 160. In various embodiments, anomaly detector 160 is or is not a machine learning (ML) model, which is already trained. In an embodiment, anomaly detector 160 is an artificial neural network (ANN) such as a deep neural network (DNN).

Functionally, anomaly detector 160 is a numeric regression that generates or infers a numeric anomaly score that measures how unfamiliar, abnormal, or suspicious is a tuple such as any of tuples 121, 140, and T5. In various embodiments, the anomaly score is or is not a probability that a tuple is anomalous. A numeric anomaly score may be compared to a predefined anomaly threshold to detect whether or not the tuple is anomalous. Generally, an anomalous tuple should have a higher anomaly score than a non-anomalous tuple.

1.2 Machine Learning Explainability (MLX)

As discussed later herein, each of explainers 181-182 generates a respective explanation of why anomaly detector 160 generated the anomaly score of any given tuple. For example in various scenarios, a tuple to explain T5, its anomaly score, and/or anomaly detector 160 are reviewed for various reasons. ML explainability (MLX) herein can provide combinations of any of the following functionalities:

- Explainability: The ability to explain why a given anomaly score occurred for tuple to explain T5
- Interpretability: The level at which a human can understand the explanation
- What-If Explanations: Understand how changes in tuple to explain T5 may or may not change the anomaly score and/or change the tuple from anomalous to non-anomalous or vice versa.
- Model-Agnostic Explanations: Explanations may treat anomaly detector 160 as a black box, instead of using internal properties from anomaly detector 160 to guide the explanation For example, the explanation may be needed for regulatory compliance. Likewise, the explanation may reveal an edge case that causes anomaly detector 160 to malfunction for which retraining with different data or a different hyperparameters configuration is needed.

1.3 Corpus

If any of anomaly detector 160 and/or explainers 181-182 is an ML model, then the ML model is already trained. Corpus 110 is not necessarily a training corpus of anomaly detector 160 and explainers 181-182. Corpus 110 includes metadata and data that computer 100 stores or has access to. In an embodiment, corpus metadata is stored or cached in volatile memory, and corpus data is stored in nonvolatile storage that is local or remote.

Corpus data defines a portion of a multidimensional problem space and includes original tuples 121. Original tuples 121 are respective points in the multidimensional problem space. Original tuples 121 includes individual original tuples T1-T4 that collectively contain original values 122 that includes individual values V1-V17. Each of original tuples 121 contains a respective value for each of features F1-F7. For example as shown, the value of feature F1 in original tuples T1-T2 is value V1.

Corpus metadata generalizes or otherwise describes corpus data. Corpus metadata includes features F1-F7 that can describe tuple 150 that is shown with a dashed outline to demonstrate that tuple 150 may be any individual tuple of tuples 121, 140, or T5.

1.4 Feature Engineering

Tuple 150 contains a respective value for each of features F1-F7. In an embodiment, tuple 150 is, or is used to generate, a feature vector that anomaly detector 160 accepts and that contains more or less densely encoded respective values for features F1-F7. Each of features F1-F7 has a respective datatype. For example, features F1 and F3 may have a same datatype. A datatype may variously be: a) a number that is an integer or real, b) a primitive type such as a Boolean or text character that can be readily encoded as a number, c) a sequence of discrete values such as text literals that have a semantic ordering such as months that can be readily encoded into respective numbers that preserve the original ordering, or d) a category that enumerates distinct categorical values that are semantically unordered.

Categories are prone to discontinuities that may or may not seemingly destabilize anomaly detector 160 such that different categorical values for a same feature may or may not cause anomaly detector 160 to generate very different anomaly scores. One categorical feature may be hash encoded into one number in a feature vector or n-hot or 1-hot encoded into multiple numbers. For example, 1-hot encoding generates a one for a categorical value that actually occurs in a tuple and also generates a zero for each possible categorical value that did not occur in the tuple.

Tuple 150 may represent various objects in various embodiments. For example, tuple 150 may be or represent a network packet, a record such as a database table row, or a log entry such as a line of text in a console output logfile. Likewise, features F1-F7 may be respective data fields, attributes, or columns that can occur in each object instance.

1.5 Example Features

The following Table 1 provides examples of features that may occur in tuples that each represent a respective database statement in a log of a database server.

| | Theme | Feature | Meaning |
|---|---|---|---|
| 131 | Database connection and database session | F1 | All or part of a connection URL of ODBC or JDBC |
| | | F2 | Session duration |
| 132 | Kind of database statement | F3 | Language |
| | | F4 | Verb |
| | | F5 | State |
| 133 | Result of statement | F6 | Error code |
| | | F7 | Rows returned |

In above Table 1 for theme 131, feature F1 may be or contain a part of an open database connectivity (ODBC) or Java ODBC (JDBC) uniform resource locator (URL) that was used to establish a network connection and a database session. Example connection string parts include standard URL parts (e.g. protocol, server host, and network port number) and ODBC/JDBC specific parts in the path or query parameters such as a name of a database, schema, or user account. Feature F2 may indicate how old was the database session when the session issued the database statement.

In above Table 1 for theme 132, feature F3 may be a 1-hot encoding of the dialect of structured query processing language (SQL) of the database statement such as data definition language (DDL), data manipulation language (DML), data query language (DQL), and transaction control language (TCL). Feature F4 may be a 1-hot encoding of the verb of the database statement such as SELECT, INSERT, DELETE, UPDATE, CREATE, DROP, GRANT, BEGIN, and COMMIT. Feature F5 may be an n-hot encoding of the state or context of the database statement such as: outside of a transaction, inside a demarked transaction, auto-committed transaction, and prepared statement.

In above Table 1 for theme 133, feature F6 may be a return code of the database statement such as an error code. Feature F7 may be a count of rows in the result set returned by the database statement.

Other examples not shown in Table 1 include a schema theme that contains features such as an n-hot encoding of database tables referenced by a database statement. A query criteria theme may contain features that describe a WHERE clause such as a count of joins specified, a LIMIT clause on results, a sorting direction, and the DISTINCT keyword.

1.6 Explainers

Anomaly detector 160 may be applied to a tuple such as tuple 150 to generate anomaly score 170 that is shown with a dashed outline to demonstrate that anomaly score 170 may be any individual anomaly score of a given tuple of tuples 121, 140, or T5. Anomaly score 170 indicates whether or not tuple 150 is anomalous such as based on a threshold. When anomaly detector 160 detects an anomaly in a production environment, an alert may be generated to provoke a human or automated security reaction such as terminating a session or network connection, rejecting tuple 150 from further processing, and/or recording, diverting, and/or alerting tuple 150 for more intensive manual or automatic inspection and analysis.

Each of explainers 181-182 may be applied to a given tuple of tuples 121, 140, or T5 to generate an explanation that indicates one or more of features 130 as a cause of anomaly score 170 of the tuple being anomalous. For example, explainers 181-182 are shown as respective columns that contain explanations that are formatted as data structures that are stored in computer 100. Each row in those two columns corresponds to a respective tuple of anomalous tuples 140.

One or more of values 145 respectively for one or more of features 130 may respectively cause tuples 140 to be anomalous. In this example, a respective one of features 130 actually cause respective some of tuples 140 to be anomalous. For example, value V18 is shown as bold in values 145 to indicate that feature F6 actually caused tuple P1 to be anomalous. Actual causality is discussed later herein.

An explanation may be more or less inaccurate. For example as shown, explainer 181 generates an explanation that wrongly indicates that feature F2 is why tuple P1 is anomalous. A feature that is correctly identified as causal in an explanation is shown as bold. For example, explainer 181 generates an explanation that correctly indicates that F4 is the reason that tuple P2 is anomalous.

In the shown embodiment, each of anomalous tuples 140 has one feature that actually is causal. For example, value V18 of feature F6 is causal for tuple P1. In an embodiment, each of anomalous tuples 140 has a respective count of feature(s) that actually are causal.

In the shown embodiment, explainer 181 generates explanations that always identify exactly one feature as causal. In the shown embodiment, explainer 182 generates explanations that always identify a subset of features 130 having a fixed count of multiple features as causal. For demonstration in the shown embodiment, explainers 181-182 generate explanations having different respective counts of feature(s) as causal. In an embodiment, all explainers generate explanations having a same count of feature(s) as causal. In an embodiment, an explainer generates explanations having different respective counts of features as causal.

1.7 Explanation Assessment

In an embodiment, an explanation is regarded as correct if the explanation correctly identifies at least a threshold amount of causal features. For example, three features may actually be causal, and the explanation may identify four features as causal, of which two identified features actually are causal. In that case, the explanation is correct if the threshold is less than three, and the explanation instead is incorrect if the threshold is more than two.

In the shown embodiment, the threshold is one, and the explanation that explainer 182 generates for tuple P2 is considered to be correct because one (i.e. feature F4) feature is correctly contained in the explanation, which is why F4 is shown in bold in the explanation. Likewise, there are no features shown in bold in both incorrect explanations that are respectively generated by explainers 181-182 for tuple P1.

As shown, the count of correct explanations by explainers 181-182 respectively are two and one. Thus, explainer 181 is better (i.e. more accurate) than explainer 182. For example in a laboratory environment that contains computer 100, computer 100 may automatically select explainer 181 as a best explainer. Afterwards, explainer 181 may be deployed into a production environment for production use.

Which of features 130 actually cause anomaly detector 160 to generate anomaly score 170 high enough for arbitrary tuple 150 to be anomalous may be difficult or impossible to directly observe because anomaly detector 160 may be opaque. As follows, computer 100 may specially select and modify tuple 150 in a controlled way that provides exact knowledge of at least one or some of features 130 being a cause of an anomaly. With such knowledge, computer 100 may reliably classify explanations by explainers 181-182 as correct or incorrect.

Original tuples 121 contains non-anomalous tuples and some or no anomalous tuples. In an embodiment, original tuples 121 are unlabeled such that which tuples are non-anomalous is initially unknown. Anomaly detector 160 may generate a respective anomaly score for each of original tuples and, based on those anomaly scores and an anomaly threshold, a non-anomalous subset of original tuples 121 may be selected. Anomalous tuples in original tuples 121 are unused herein.

1.8 Perturbation

From the non-anomalous subset of original tuples 121, many perturbed tuples are generated. Herein, a perturbed tuple is an imperfect copy of a (e.g. randomly selected) non-anomalous tuple. For example, perturbed tuples P1, P2, and P4 are respective imperfect copies of original tuples T1, T2, and T4. A perturbed tuple is generated by modifying the value of some feature(s) of an original tuple. In values 145, perturbed values are shown in bold. For example, value V5 of feature F2 is a perturbed value in perturbed tuple P4. Whereas, value V9 of feature F4 is exactly copied into perturbed tuple P4 from original tuple T4.

In an embodiment, a group of multiple features are perturbed in a same perturbed tuple, such as any of groups 131-133. For example, perturbing group 132 entails perturbing features F3-F5. In an embodiment, groups may overlap. For example, feature F3 may be in multiple groups. In an embodiment, perturbed tuples P1-P2 may each have a different respective feature group perturbed. Feature groups are discussed later herein.

Anomaly detector 160 generates an anomaly score for each perturbed tuple. If the anomaly score of a perturbed tuple indicates that the perturbed tuple is non-anomalous, then that perturbed tuple is discarded. Anomalous perturbed tuples are retained as anomalous tuples 140, which may have a predefined count of tuples. Perturbation techniques are discussed later herein.

Anomalous tuples 140 are special because: a) they are known to be anomalous, and b) which feature(s) caused each tuple to become anomalous by perturbation is known. For example, perturbed tuples P1, P2, and P4 are known to be anomalous. Likewise, value V5 of feature F2 is known to be a cause of perturbed tuple P4 being anomalous, which can be used to detect the accuracy of explanations by explainers 181-182 for perturbed tuple P4. For example, computer 100 may automatically detect that explainer 181 generates an explanation that correctly identifies feature F2 as a cause of perturbed tuple P4 being anomalous. Likewise, computer 100 may automatically detect that explainer 182 generates an incorrect explanation for perturbed tuple P4.

In an embodiment, one of explainers 181-182 implements Shapley additive explanation (SHAP) as presented in non-patent literature (NPL) “A unified approach to interpreting model predictions” published by Scott Lundberg et al in Advances In Neural Information Processing Systems 30 (2017) that is incorporated in its entirety herein.

In an embodiment, one of explainers 181-182 implements local interpretable model-agnostic explanations (LIME) as presented in NPL “Why should I trust you? Explaining the predictions of any classifier” published by Marco Ribeiro et al in Proceedings of the 22nd ACM SIGKDD International Conference on Knowledge Discovery and Data Mining (2016) that is incorporated in its entirety herein. In an embodiment, one of explainers 181-182 combines SHAP and LIME (e.g. kernel SHAP as presented in the SHAP NPL).

In an embodiment, anomaly detector 160 is an artificial neural network (ANN) that is not opaque, and computer 100 has full access to the weights of the connections between neurons in the ANN such as for backpropagation as discussed later herein. One of explainers 181-182 may implement an explanation approach that is based on backpropagation such as layer-wise relevance propagation (LRP) as presented in NPL “On pixel-wise explanations for non-linear classifier decisions by layer-wise relevance propagation” published by Sebastian Bach et al in Public Library of Science (PLOS) One, volume 10 number 7 (2015) that is incorporated in its entirety herein. Due to the integration with internals of an ANN, the approach herein is accelerated when LRP is used.

In an embodiment not shown, any or all of active components 160 and 181-182 are hosted in a different computer that is not computer 100, and computer 100 applies techniques herein by remotely using the active component. For example, computer 100 may send tuple 150 to an active component over a communication network and responsively receive anomaly score 170 or an explanation over the communication network. For example, computer 100 and the active component may be owned by different parties and/or hosted in different data centers. In various embodiments that host the active component in computer 100, techniques herein may or may not share an address space and/or operating system process with the active component. For example, inter-process communication (IPC) may or may not be needed to invoke the active component.

2.0 Example Fidelity Measurement Process

Figure 2:
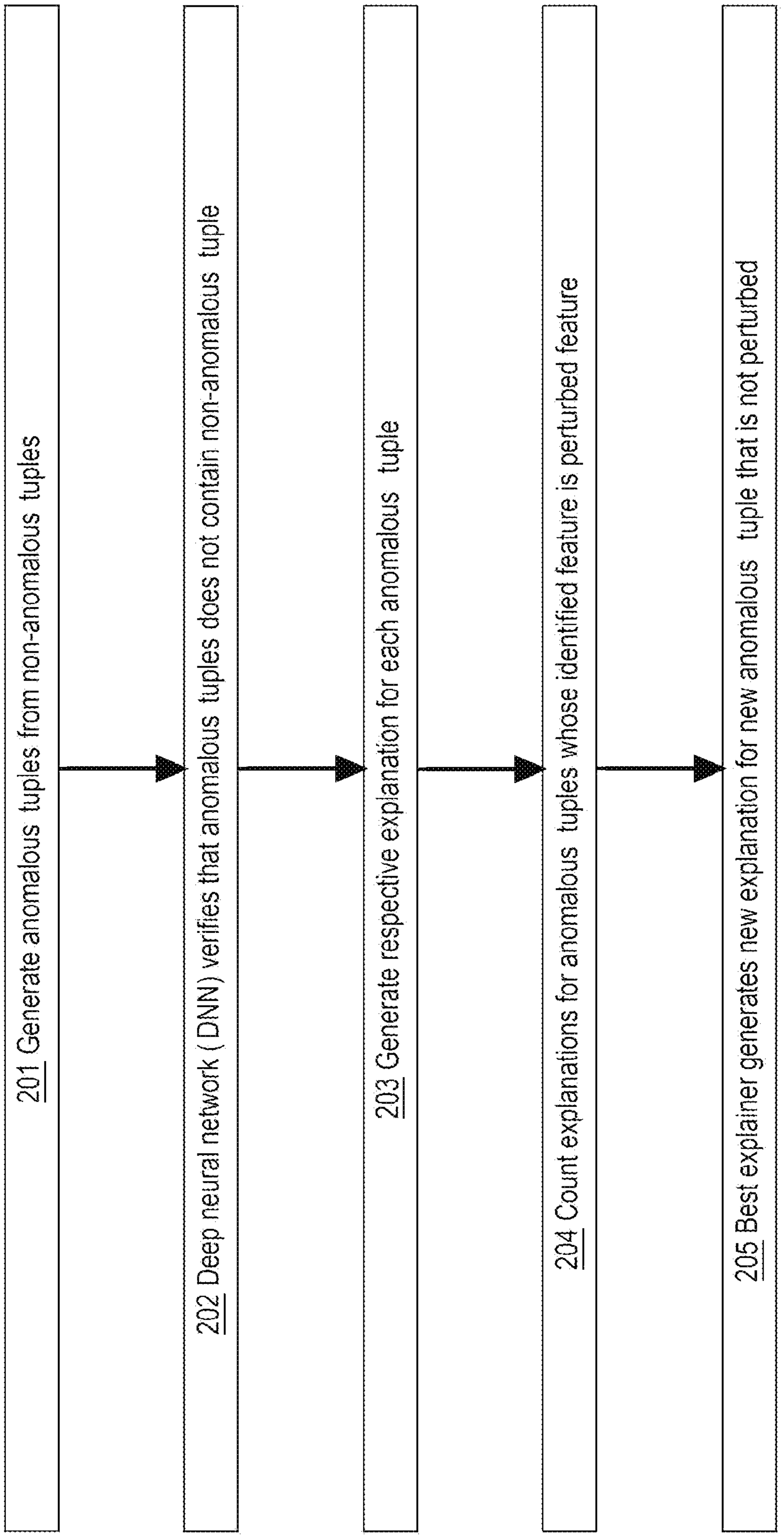
FIG. 2 is a flow diagram that depicts an example computer process that calculates and uses a novel fidelity metric for explainers that are based on feature attribution.

FIG. 2 is a flow diagram that depicts an example process that an embodiment of computer 100 may perform for calculating and using a novel fidelity metric for explainers 181-182 that are based on feature attribution. FIG. 2 is discussed with reference to FIG. 1.

Steps 201-202 are preparatory and do not entail explainers. Step 201 generates anomalous tuples 140 from the subset of original tuples 121 that are non-anomalous. If original tuples 121 lack labels that include an anomaly score and/or a binary anomaly classification, then step 201 identifies the non-anomalous tuples by applying anomaly detector 160 to original tuples 121 as discussed earlier herein. Step 201 uses perturbation to generate artificial tuples as discussed elsewhere herein.

In step 202, anomaly detector 160 verifies that anomalous tuples 140 does not contain any non-anomalous tuple. In an embodiment, anomaly detector 160 is a deep neural network (DNN), which is not an interpretable ML model.

Some perturbed tuples generated by step 201 might not be anomalous. In an embodiment, the sequence of steps 201-202 is repeated for each tuple generated by perturbation. For example if step 202 detects that the perturbed tuple currently generated by step 201 is non-anomalous, then that perturbed tuple is discarded. In that embodiment, the sequence of steps 201-202 may be repeated until anomalous tuples 140 contains a predefined count of tuples.

In step 203, one or both of explainers 181-182 generates a respective explanation for each of anomalous tuples 140. If an explainer is trainable and generates a global explanation, then the explainer may be already trained before the process of FIG. 2. If an explainer is trainable and generates a local explanation, then the explainer may be separately trained for each of anomalous tuples 140, which may be accelerated by performing step 203, including training the explainer, for each of anomalous tuples 140 in parallel.

Step 204 counts correct explanations from one or both of explainers 181-182. In an embodiment, one or more respective features are perturbed in each of anomalous tuples 140, and an explainer generates explanations that identify a respective one or more of features 130 as causing a respective perturbed tuple to be anomalous. Step 204 counts correct explanations, which are those whose identified subset of features in the explanation contains at least a threshold count of features that are in the respective subset of perturbed features in each perturbed tuple.

In a preferred embodiment, the threshold is the count of perturbed features such that an explanation is correct only if it identifies at least all perturbed features. In an embodiment, the threshold is the size of the identified subset such that an explanation is correct only if all of its identified features are perturbed features. In various embodiments, the explanation identifies at least or exactly as many features as are perturbed.

Step 204 does not count incorrect explanations, which are those that identify none of the features that are perturbed in the tuple. Alternative correctness criteria are discussed later herein.

In an embodiment, an explanation may identify (e.g. rank by relative importance) more features than are perturbed in a tuple. In an embodiment, step 204 treats the explanation as if it were truncated to identify only a top threshold count of features, which may or may not be how many features are perturbed in the tuple.

In an embodiment, features are perturbed in groups as discussed earlier herein, and the explanation identifies groups instead of individual features. Discussed above and later herein is a threshold count of correctly identified features and a threshold count of top ranked identified features for explanation truncation. Both of those thresholds may be applied to groups instead of individual features. For example, an explanation that identifies three groups may be correct only at least two of those three groups were perturbed.

In an embodiment, the process of FIG. 2 has only one explainer and excludes step 205. For example for an explainer, step 204 may generate a fidelity measurement that is or is based on step 204's count of how many explanations from the explainer are correct. In an embodiment, the fidelity metric is normalized by arithmetically dividing the count of correct explanations by a count of anomalous tuples 140. For example, respective fidelity scores of different runs of the process of FIG. 2 are directly comparable even if each run had a different respective count of anomalous tuples 140. In other words, the fidelity metric may be a correctness percentage, which is a universally comparable metric.

In an embodiment having multiple explainers, an explainer with a highest fidelity measurement may be selected as a best explainer and deployed into a production environment for generating production explanations. In the production environment in step 205, the best explainer generates a new explanation for a new anomalous tuple that is: a) not perturbed and/or b) not in original tuples 121. For example, new tuple to explain T5 might not have existed: a) when original tuples 121 were recorded and/or b) when the best explainer was selected or being deployed into production.

3.0 First Example Perturbation Tuning Process

Figure 3:
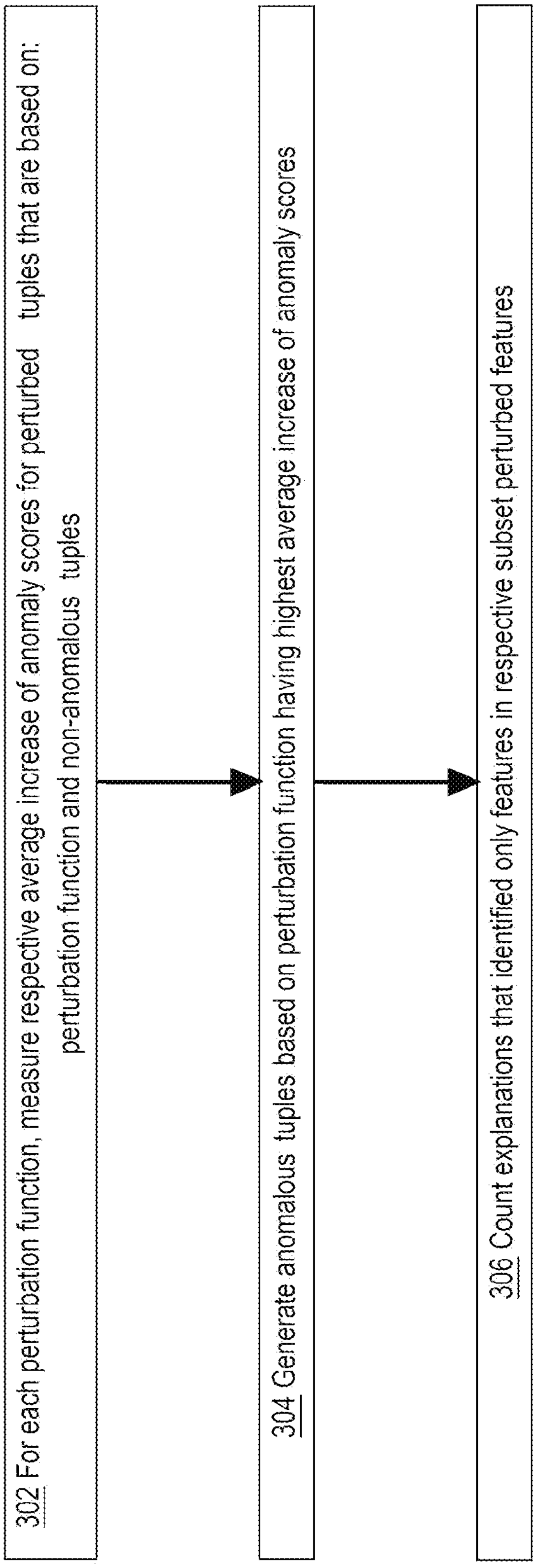
FIG. 3 is a flow diagram that depicts an example computer process that automatically selects a best kind of perturbation.

FIG. 3 is a flow diagram that depicts an example process that an embodiment of computer 100 may perform to automatically select a best kind of perturbation. The steps of the processes of FIGS. 2-3 are complementary and may be combined or interleaved. FIG. 3 is discussed with reference to FIG. 1.

As explained earlier herein, the purpose of perturbation is to generate anomalies, but perturbation may sometimes generate unwanted non-anomalies, which may decelerate computer 100's generation of a predefined count of anomalous tuples 140. Some ways of perturbation may accelerate by generating fewer non-anomalous tuples. However, which way of perturbation is fastest for generating anomalies may depend on features 130, original values 122, and/or anomaly detector 160.

Each of multiple perturbation functions may provide a distinct way of perturbation. For each perturbation function, step 302 measures a respective average increase of anomaly scores for perturbed tuples that are based on: the perturbation function and the non-anomalous tuples of original tuples 121.

In an embodiment, one perturbation function provides a predefined perturbed value such as zero or null. Unlike other approaches, the predefined value need not be neutral with a tendency not to impact an anomaly score. Unlike other approaches, the predefined value need not be domain specific such as LIME's super-pixel in a visual image.

In an embodiment, one perturbation function provides a value that is not predefined, such as a random perturbed value that may change whenever the perturbation function is invoked. Step 304 generates anomalous tuples 140 by invoking a best perturbation function having a highest average increase of anomaly scores, which provides the most acceleration for generating anomalies.

In an embodiment, multiple respective features are perturbed in each of anomalous tuples 140, and an explainer generates explanations that identify a respective one or more of features 130 as causing a respective perturbed tuple to be anomalous. Step 306 counts correct explanations, which are those whose identified subset of features in the explanation contains no feature that is not in the respective subset of perturbed features in each perturbed tuple. Step 306 does not count incorrect explanations, which are those that identify a feature that is not perturbed in the tuple. In various embodiments, step 306 does or does not count correct explanations that contain fewer features than are perturbed in the tuple.

4.0 Second Example Perturbation Tuning Process

Figure 4:
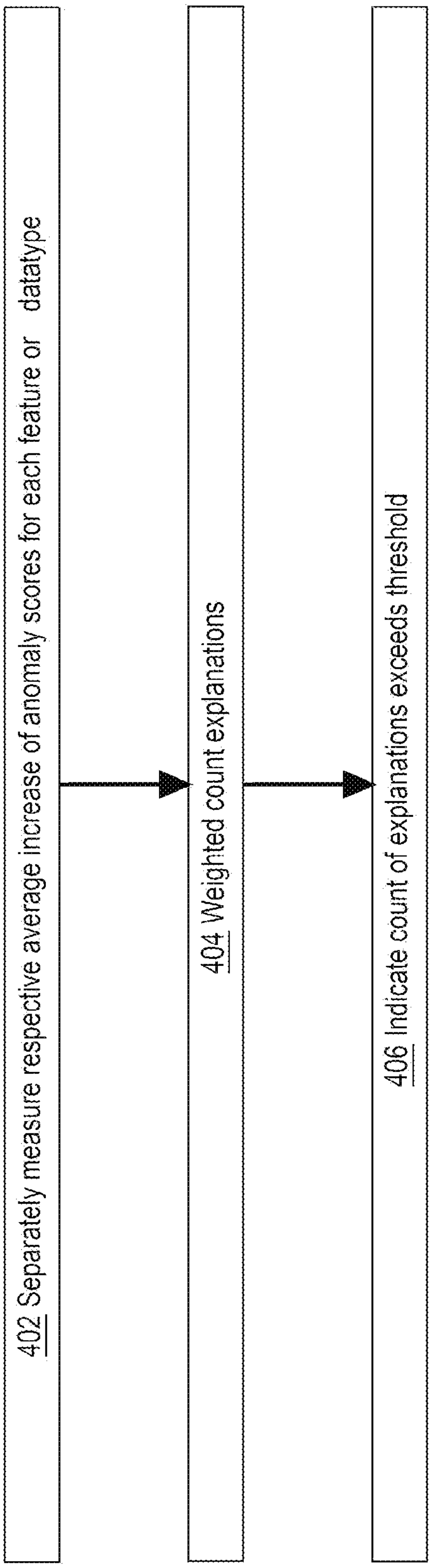
FIG. 4 is a flow diagram that depicts an example computer process that automatically selects a best kind of perturbation.

FIG. 4 is a flow diagram that depicts an example process that an embodiment of computer 100 may perform to automatically select a best kind of perturbation. The steps of the processes of FIGS. 2-4 are complementary and may be combined or interleaved. FIG. 4 is discussed with reference to FIG. 1.

As discussed earlier herein, a best perturbation function may be selected with a highest average increase of anomaly scores. In various embodiments, step 402 separately measures a respective average increase of anomaly scores for each feature or, if multiple features share a same datatype, for each feature datatype.

Step 404 weighted counts explanations whose identified feature(s) are in the respective subset of perturbed features in the respective tuples. In an embodiment, the weighted count is increased by one for each correctly identified feature, even if the explanation does not otherwise exactly match the perturbed features in the respective tuples. In an embodiment, the weighted count is decreased by one for each perturbed feature not identified by the explanation.

In one example, an explanation identifies exactly two features, which are two of five perturbed features, which increases the count by two for the two correct features and decreases the count by three for the three perturbed features that were not identified by the explanation. For that explanation, the net adjustment to the count is 2−3=negative one, which decreases the weighted count by one.

Step 406 indicates whether or not the (e.g. weighted) count of explanations exceeds a threshold. For example, an experimental explainer that does not exceed the threshold may be excluded from further research and development, or an explainer that, while working in a production environment, eventually falls below the threshold may be alerted and/or replaced.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
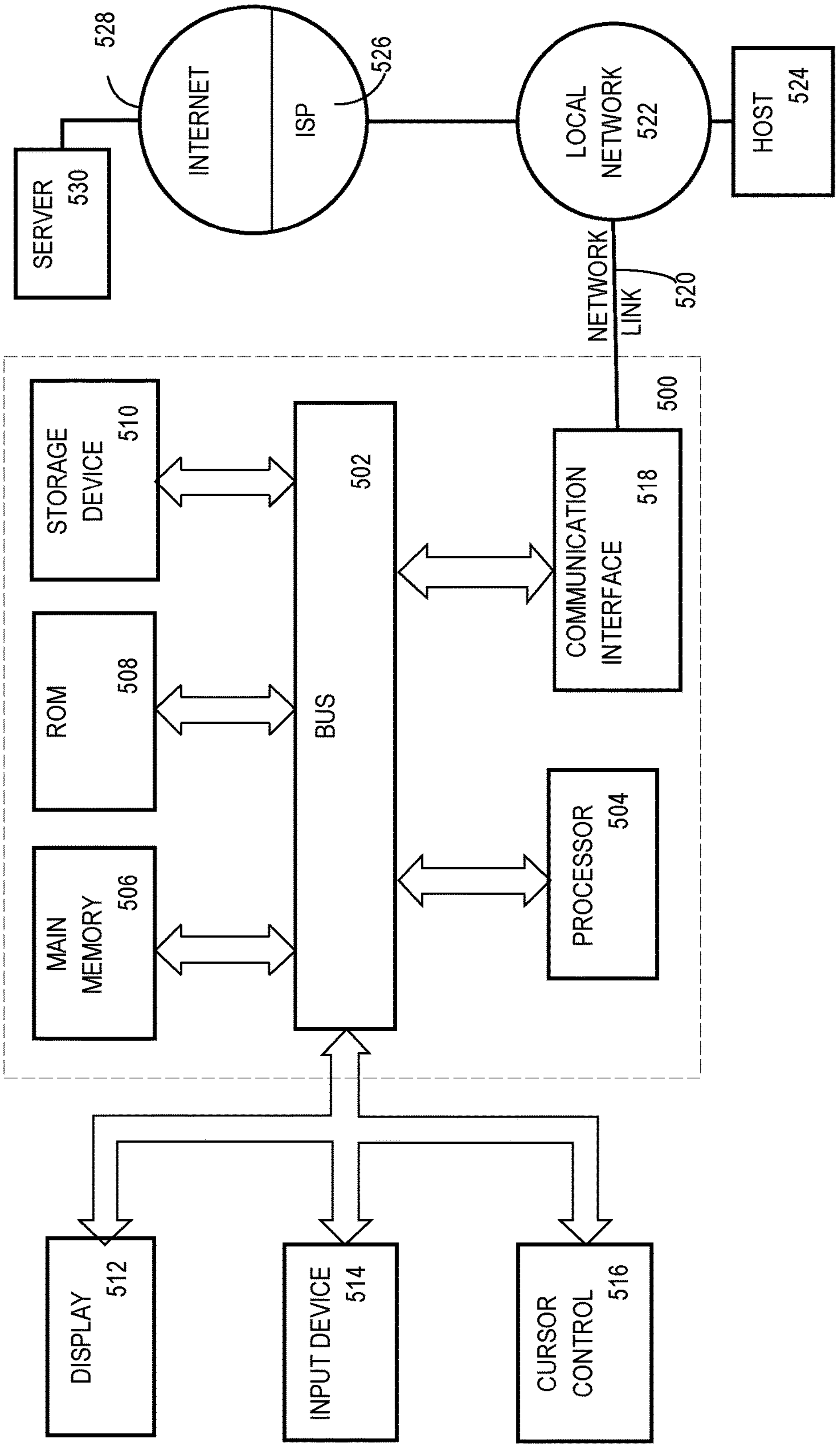
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
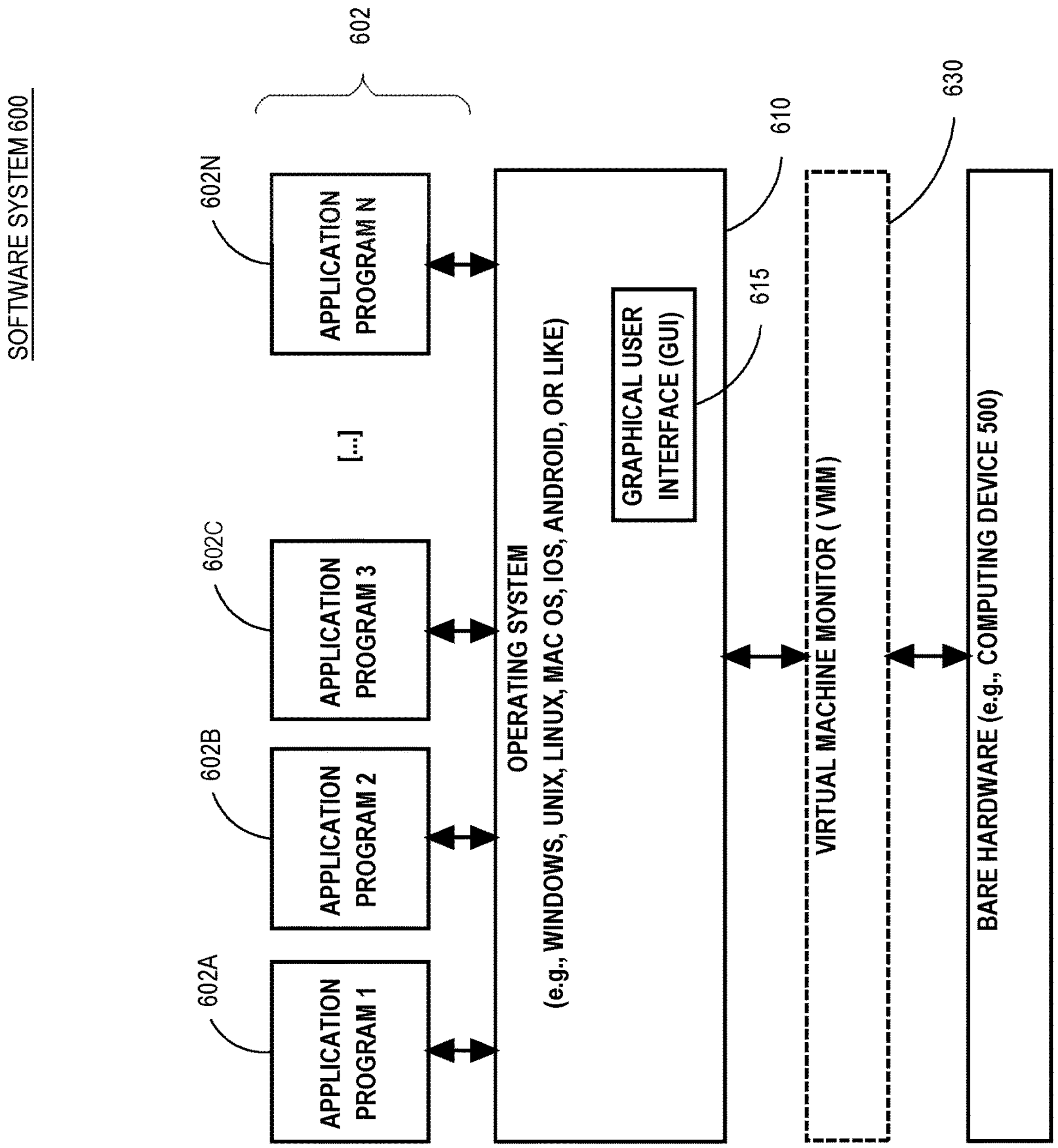
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating, by a particular anomaly detector in a computer, a plurality of non-anomalous scores respectively for a plurality of non-anomalous tuples;

for each perturbation function of a plurality of perturbation functions:

a) generating, using the perturbation function, multiple perturbed tuples from a plurality of non-anomalous tuples, b) generating, by the particular anomaly detector, a plurality of anomaly scores respectively for the multiple perturbed tuples, and c) measuring a respective average increase of anomaly scores for said multiple perturbed tuples;

generating, using a perturbation function of the plurality of perturbation functions having a highest average increase of anomaly scores, a plurality of anomalous tuples from said plurality of non-anomalous tuples, wherein:

each anomalous tuple of the plurality of anomalous tuples contains a perturbed value of a respective perturbed feature of a plurality of features, and the plurality of anomalous tuples contains a predefined count of anomalous tuples;

generating, by an explainer in the computer, a plurality of explanations, including a respective explanation for each anomalous tuple of the plurality of anomalous tuples, wherein the explanation of each anomalous tuple of the plurality of anomalous tuples identifies a respective identified feature of the plurality of features as a cause of the anomalous tuple being anomalous; and generating a fidelity score for the explainer by counting explanations in said plurality of explanations whose identified feature is the perturbed feature;

wherein the method is performed by the computer.

2. The method of claim 1 wherein:

said generating the explanations and said counting the explanations are respectively repeated using each explainer of a plurality of explainers;

the method further comprises generating, by an explainer of the plurality of explainers having a highest count by said counting the explanations, a new explanation for a new anomalous tuple that is not in the plurality of anomalous tuples.

3. The method of claim 1 wherein:

the explanation of each anomalous tuple of the plurality of anomalous tuples identifies a respective subset of the plurality of features as said cause of the anomalous tuple being anomalous;

said counting the explanations comprises counting explanations for the plurality of anomalous tuples whose respective subset of the plurality of features contains at least a threshold count of features that are perturbed in the respective tuple of an explanation.

4. The method of claim 3 wherein a size of the subset of the plurality of features does not exceed a threshold.

5. The method of claim 1 wherein:

the explanation of each anomalous tuple of the plurality of anomalous tuples identifies a respective subset of the plurality of features, including a second identified feature, as said cause of the anomalous tuple being anomalous;

said counting the explanations comprises not counting explanations for the plurality of anomalous tuples whose second identified feature is not perturbed in the respective tuple of an explanation.

6. The method of claim 1 wherein:

the explanation of each anomalous tuple of the plurality of anomalous tuples identifies a respective subset of the plurality of features as said cause of the anomalous tuple being anomalous;

said counting the explanations comprises weighted counting based on the respective subsets of the plurality of features identified by the explanations.

7. The method of claim 1 further comprising indicating that said counting the explanations exceeds a threshold.

8. The method of claim 1 wherein the perturbed value is not predefined.

9. The method of claim 1 further comprising verifying, by a deep neural network (DNN), that the plurality of anomalous tuples does not contain a non-anomalous tuple, wherein the plurality of non-anomalous tuples are unlabeled.

10. The method of claim 1 wherein the plurality of non-anomalous tuples are unlabeled.

11. The method of claim 1 wherein:

said measuring separately measures a respective average increase of anomaly scores for each feature of the plurality of features;

generating the perturbed value of the perturbed feature is based on a perturbation function of the plurality of perturbation functions having a highest average increase of anomaly scores for the perturbed feature.

12. One or more non-transitory computer-readable media storing instructions that, when executed by one or more processors in a computer, cause:

generating, by a particular anomaly detector in the computer, a plurality of non-anomalous scores respectively for a plurality of non-anomalous tuples;

for each perturbation function of a plurality of perturbation functions:

a) generating, using the perturbation function, multiple perturbed tuples from a plurality of non-anomalous tuples, b) generating, by the particular anomaly detector, a plurality of anomaly scores respectively for the multiple perturbed tuples, and c) measuring a respective average increase of anomaly scores for said multiple perturbed tuples;

generating, using a perturbation function of the plurality of perturbation functions having a highest average increase of anomaly scores, a plurality of anomalous tuples from said plurality of non-anomalous tuples, wherein:

each anomalous tuple of the plurality of anomalous tuples contains a perturbed value of a respective perturbed feature of a plurality of features, and the plurality of anomalous tuples contains a predefined count of anomalous tuples;

generating, by an explainer in the computer, a plurality of explanations, including a respective explanation for each anomalous tuple of the plurality of anomalous tuples, wherein the explanation of each anomalous tuple of the plurality of anomalous tuples identifies a respective identified feature of the plurality of features as a cause of the anomalous tuple being anomalous; and generating a fidelity score for the explainer by counting explanations in said plurality of explanations whose identified feature is the perturbed feature.

13. The one or more non-transitory computer-readable media of claim 12 wherein:

said generating the explanations and said counting the explanations are respectively repeated using each explainer of a plurality of explainers;

the instructions further cause generating, by an explainer of the plurality of explainers having a highest count by said counting the explanations, a new explanation for a new anomalous tuple that is not in the plurality of anomalous tuples.

14. The one or more non-transitory computer-readable media of claim 12 wherein:

the explanation of each anomalous tuple of the plurality of anomalous tuples identifies a respective subset of the plurality of features as said cause of the anomalous tuple being anomalous;

said counting the explanations comprises counting explanations for the plurality of anomalous tuples whose respective subset of the plurality of features contains at least a threshold count of features that are perturbed in the respective tuple of an explanation.

15. The one or more non-transitory computer-readable media of claim 12 wherein:

the explanation of each anomalous tuple of the plurality of anomalous tuples identifies a respective subset of the plurality of features as said cause of the anomalous tuple being anomalous;

said counting the explanations comprises weighted counting based on the respective subsets of the plurality of features identified by the explanations.

16. The one or more non-transitory computer-readable media of claim 12 wherein the perturbed value is not predefined.

17. The one or more non-transitory computer-readable media of claim 12 wherein the instructions further cause verifying, by a deep neural network (DNN), that the plurality of anomalous tuples does not contain a non-anomalous tuple, wherein the plurality of non-anomalous tuples are unlabeled.

18. The one or more non-transitory computer-readable media of claim 12 wherein the plurality of non-anomalous tuples are unlabeled.

19. The one or more non-transitory computer-readable media of claim 12 wherein the instructions further cause indicating that said counting the explanations exceeds a threshold.

20. The one or more non-transitory computer-readable media of claim 14 wherein a size of the subset of the plurality of features does not exceed a threshold.

* * * * *